3,005,757
PREPARATION OF CHLOROGENICASE
James C. Lewis, Berkeley, Calif., assignor to the United States of America as represented by the Secretary of Agriculture
No Drawing. Filed Nov. 14, 1960, Ser. No. 69,236
3 Claims. (Cl. 195—65)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has as its prime object the provision of noval processes for preparing chlorogenicase. Further objects and advantages of the invention will be evident from the following description wherein parts and percentages are by weight unless otherwise specified.

Chlorogenicase is an enzyme which has the specific ability of converting chlorogenic acid into caffeic acid and quinic acid. In accordance with the invention, chlorogenicase is prepared by culturing *Aureobasidium pullulans* (formerly termed *Pullularia pullulans*) on a nutrient medium containing p-hydroxybenzoic acid or 3,4-dimethoxybenzaldehyde. The critical ingredient of the medium is the p-hydroxybenzoic acid or 3,4-dimethylbenzaldehyde; the other ingredients may be those conventionally used in culturing microorganisms. Thus, as conventional in this field, the medium contains an assimilable carbon source and an assimilable nitrogen source.

The assimilable carbon source may be, for example, a carbohydrate such as glucose, sucrose, maltose, beet or cane molasses, and the like. Of these, glucose is preferred and is generally used in a concentration of about 0.5 to 3%.

The assimilable nitrogen source may be, for example, a proteinous material such as meat extracts, yeast hydrolysates, peptones, etc. or inorganic salts such as ammonium chloride, ammonium sulphate, etc. It is preferred to use mixtures of beef extract and peptone in a concentration of about 0.5 to 1%.

The nutrient medium may also contain the usual nutrient salts such as potassium acid phosphate, magnesium sulphate, ammonium chloride, or the like.

During the fermentation it is not necessary to control the pH. Generally, the pH of the medium is adjusted to about 6 prior to incubation but no attempt needs to be made to keep it at this level during the course of the fermentation. The temperature of fermentation may be that conventional in culturing microorganisms and is preferably from about room temperature (25° C.) to about 35° C.

The fermentation may be carried out by a shake-flask technique for small runs. For larger scale operation it is preferred to carry out the fermentation in a tank applying agitation and aeration to the inoculated liquid medium, that is, to conduct the culture under submerged aerated conditions.

In a typical embodiment of the invention, an aqueous nutrient medium containing about from 0.01 to 0.1% of p-hydroxybenzoic acid or 3,4-dimethroxybenzaldehyde is inoculated with a culture of *Aureobasidium pullulans*. The inoculated medium is then cultured under aerobic conditions for a period of 18 to 48 hours, depending on such factors as temperature, concentration of nutrients, etc. The chlorogenicase elaborated by the organism is largely associated with the cell material in the culture and may be recovered by centrifuging the fermented medium and collecting the de-liquefied cell cake. For a further separation, the cell cake may be allowed to stand at room temperature to cause autolysis of the cellular material. On centrifuging the autolysate, the chlorogenicase activity will then be in the liquid fraction. This liquid fraction may be further purified by conventional techniques used in the purification of enzymes, for example, dialysis, precipitation with salts, etc.

For the purpose of the invention the strains of *Aureobasidium pullulans* designed as NRRL Y–2580 and NRRL Y–2581 are preferred. Cultures of these strains have been deposited in the culture collection of the Northern Regional Research Laboratory, U.S. Department of Agriculture, Peoria, Ill. Although these strains are preferred, it is evident that other chlorogenicase-producing strains of *Aureobasidium pullulans* may be employed. The suitability of any given strain for the purposes of the invention can be readily determined by pilot trials in which the strain is cultured on the medium described herein and the fermentation product tested for chlorogenicase activity, that is, by its ability to hydrolyze chlorogenic acid.

The purified chlorogenicase, or the crude compositions containing it, may be used for the preparation of caffeic acid and quinic acid from chlorogenic acid. This may be done, for example, by adding the enzyme preparation to an aqueous solution of chlorogenic acid, preferably buffered at a pH of about 6. The system is allowed to stand at room temperature about 1 or 2 days until a substantial proportion of the chlorogenic acid is converted into caffeic acid and quinic acid. A trace of thymol may be added to the reaction system to prevent microbial growth. Chlorogenicase may also be employed as a research tool in investigating the browning of fruits and other agricultural commodities. Thus, chlorogenic acid is a natural constituent of various commodities, notably fruits and coffee, and contributes to the development of brown colorations, through enzymic reactions, when the commodities are subjected to such procedures as heating, freezing, exposure to air, etc. By applying chlorogenicase to the commodity, for example, fresh fruit pieces, the chlorogenic acid is hydrolyzed and thereby the pattern of enzymatic browning of the commodity can be altered.

The invention is further demonstrated by the following illustrative example:

*Example*

(A) A nutrient medium was prepared containing the following ingredients:

| Ingredient: | Amount, grams |
|---|---|
| Glucose | 5 |
| Beef extract | 3 |
| Peptone | 5 |
| p-Hydroxybenzoic acid | 0.3 |
| Water, sufficient to make one liter | |

(B) Ten liters of the above medium (adjusted to pH of 6 by addition of sodium hydroxide) was placed in a vat fermentor as shown by Humfeld (Jour. Bacteriology, vol. 54, pp. 689–696) equipped with an agitator and means for forcing air into the medium. The medium was inoculated with a culture of *Aureobasidium pullulans* NRRL Y–2580. The fermentation was carried out under agitated and aerated conditions at 28°C., introducing about 3 liters of air per minute, for a period of 24 hours.

(C) The procedure described above in part B was repeated except that in this case the nutrient medium was inoculated with *Aureobasidium pullulans* NRRL Y–2581.

(D) The fermented cultures as above described (B and C) were centrifuged. The centrifuge cakes (cellular material) were covered with toluene and allowed to stand 2 days at room temperature. Then the toluene was drawn off, the autolyzed cells were suspended in 500 ml. of water and centrifuged, the liquid fraction containing most of the enzyme activity being retained.

Assays were run to measure the chlorogenicase activity of the products. These were done by adding measured portions of the product to a 1% aqueous solution of chlorogenic acid buffered to pH 6.0 with sodium phosphate. The splitting of the chlorogenic acid by the enzyme was followed by chromatographic methods. The results are tabulated below:

| Run | Moist cell yield, g./l. | Chlorogenicase activity[1] | |
|---|---|---|---|
| | | In whole autolysate | In liquid separated from autolysate |
| B | 15 | 8 | 8 |
| C | 19 | 5 | 5 |

[1] Chlorogenicase activity is expressed as milligrams of chlorogenic acid split per milliliter of product per day.

(E) In control experiments wherein the procedures of runs B and C were repeated but without addition of p-hydroxybenzoic acid to the medium, good growth of *Aureobasidium pullulans* was obtained but no chlorogenicase activity could be found in the fermentation products.

Having thus described the invention, what is claimed is:

1. A process for preparing chlorogenicase which comprises culturing a chlorogenicase-producing strain of *Aureobasidium pullulans* on a nutrient medium containing a member of the group consisting of p-hydroxybenzoic acid and 3,4-dimethoxybenzaldehyde.

2. The process of claim 1 wherein the nutrient medium contains p-hydroxybenzoic acid.

3. The process of claim 1 wherein the nutrient medium contains 3,4-dimethoxybenzaldehyde.

No references cited.